United States Patent [19]

Foster

[11] Patent Number: 4,969,389
[45] Date of Patent: Nov. 13, 1990

[54] MULTISECTION HYDRAULIC DRIVE UNIT WITH SINGLE PISTON ROD

[76] Inventor: Raymond K. Foster, P.O. Box 1, Madras, Oreg. 97741

[21] Appl. No.: 333,136

[22] Filed: Apr. 3, 1989

Related U.S. Application Data

[63] Continuation-in-part of Ser. No. 189,540, May 3, 1988, Pat. No. 4,817,783.

[51] Int. Cl.$^5$ .............................................. F01B 15/00
[52] U.S. Cl. ...................... 92/66; 92/117 R; 92/119
[58] Field of Search ............ 92/51, 52, 53, 62, 65, 92/66, 117 R, 110, 111, 117 A, 118, 119; 91/176, 196

[56] References Cited

U.S. PATENT DOCUMENTS

| | | | |
|---|---|---|---|
| 1,717,485 | 6/1929 | Wirz | 92/53 |
| 2,851,999 | 9/1958 | Kratz | 121/64 |
| 2,862,448 | 12/1958 | Belding | 92/111 |
| 3,097,572 | 7/1963 | Macy | 92/13 |
| 3,152,522 | 10/1964 | Burden et al. | 92/112 |
| 3,202,062 | 8/1965 | Burden | 92/85 |
| 3,240,041 | 3/1966 | Lucke | 72/12 |
| 3,431,825 | 3/1969 | Cawley et al. | 92/166 |
| 3,485,141 | 12/1969 | Ott et al. | 92/111 |
| 3,603,207 | 9/1971 | Parrett | 92/110 |
| 3,757,645 | 9/1973 | Roch | 91/196 |
| 3,783,620 | 1/1974 | Moe | 60/547 |
| 3,905,290 | 9/1975 | Caughey | 100/215 |
| 3,913,457 | 10/1975 | Hawley | 92/66 |
| 4,125,059 | 11/1978 | Tuji | 92/51 |
| 4,143,760 | 3/1979 | Hallstrom | 198/750 |
| 4,294,572 | 10/1981 | Pattison | 92/110 |
| 4,526,086 | 7/1985 | Holton et al. | 91/176 |
| 4,695,086 | 9/1987 | Kinshofer | 92/111 |
| 4,726,281 | 2/1988 | De Filippi | 92/52 |
| 4,726,283 | 2/1988 | Miyamoto | 92/110 |
| 4,793,469 | 12/1988 | Foster | 198/750 |

FOREIGN PATENT DOCUMENTS

| | | | |
|---|---|---|---|
| 800814 | 11/1950 | Fed. Rep. of Germany | 92/53 |
| 0021579 | 2/1977 | Japan | 92/53 |
| 123147 | 2/1919 | United Kingdom | 92/111 |
| 1546090 | 5/1979 | United Kingdom | 92/51 |
| 2076894 | 12/1981 | United Kingdom | 92/53 |

Primary Examiner—Edward K. Look
Assistant Examiner—Thomas Denion
Attorney, Agent, or Firm—Delbert J. Barnard

[57] ABSTRACT

A plurality of piston heads (14, 16, 18) are spaced apart along the length of a single piston rod (12). A travelling cylinder body (20, 22, 24) is associated with each piston head (14, 16, 18). The traveling cylinder bodies (20, 22, 24) and the piston heads (14, 16, 18) define a first fluid chamber (92, 100, 88) on a common first side of the piston heads (14, 16, 18) and a set of second fluid chambers (96, 104, 90) on a common opposite side of the piston heads (14, 16, 18). A separate fluid supply and return tube (94, 102, 82) is provided for each first fluid chamber (92, 100, 88). The tubes (94, 102, 82) extend through the hollow interior (42) of the piston rod (12). A space exists in the hollow interior (42) between and around the tubes (94, 102, 82). This space serves as a supply and return passageway for all three second fluid chamber (96, 104, 90). Passageways (98, 106, 80) extend from interior space (42) to each of the second fluid chambers (96, 104, 90).

7 Claims, 8 Drawing Sheets

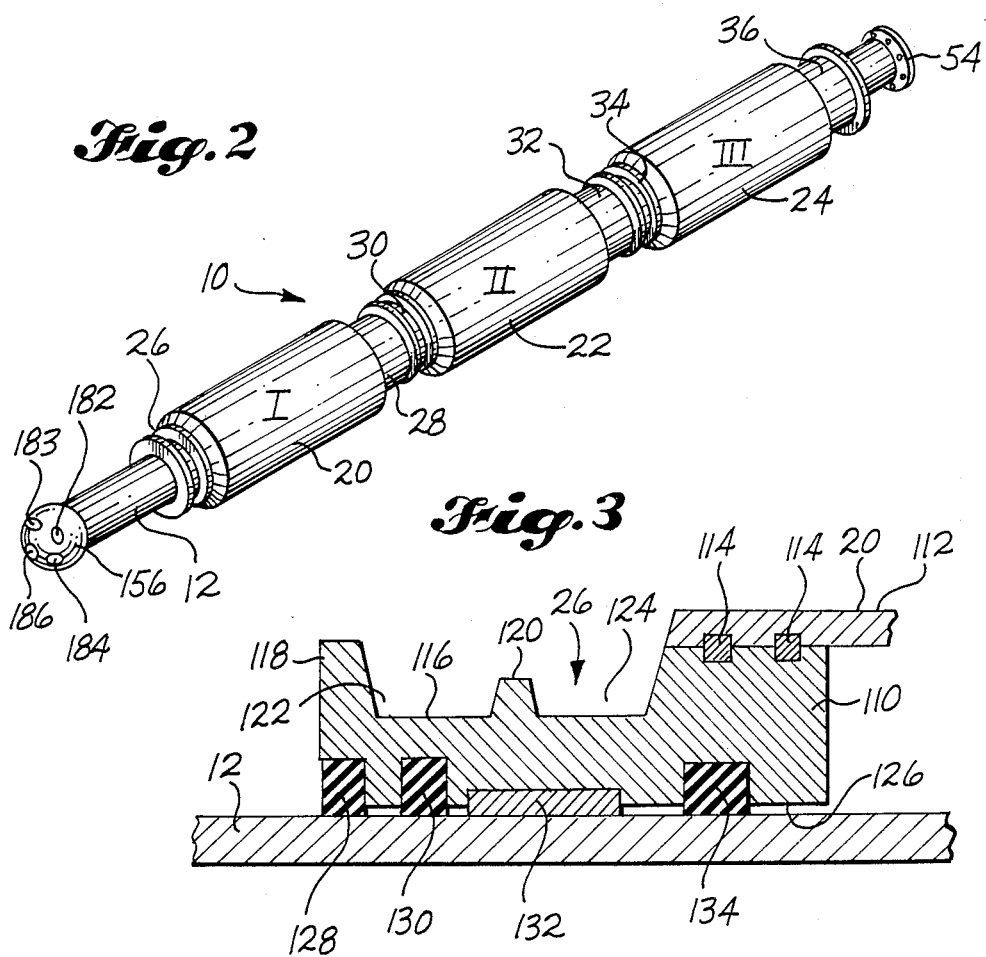

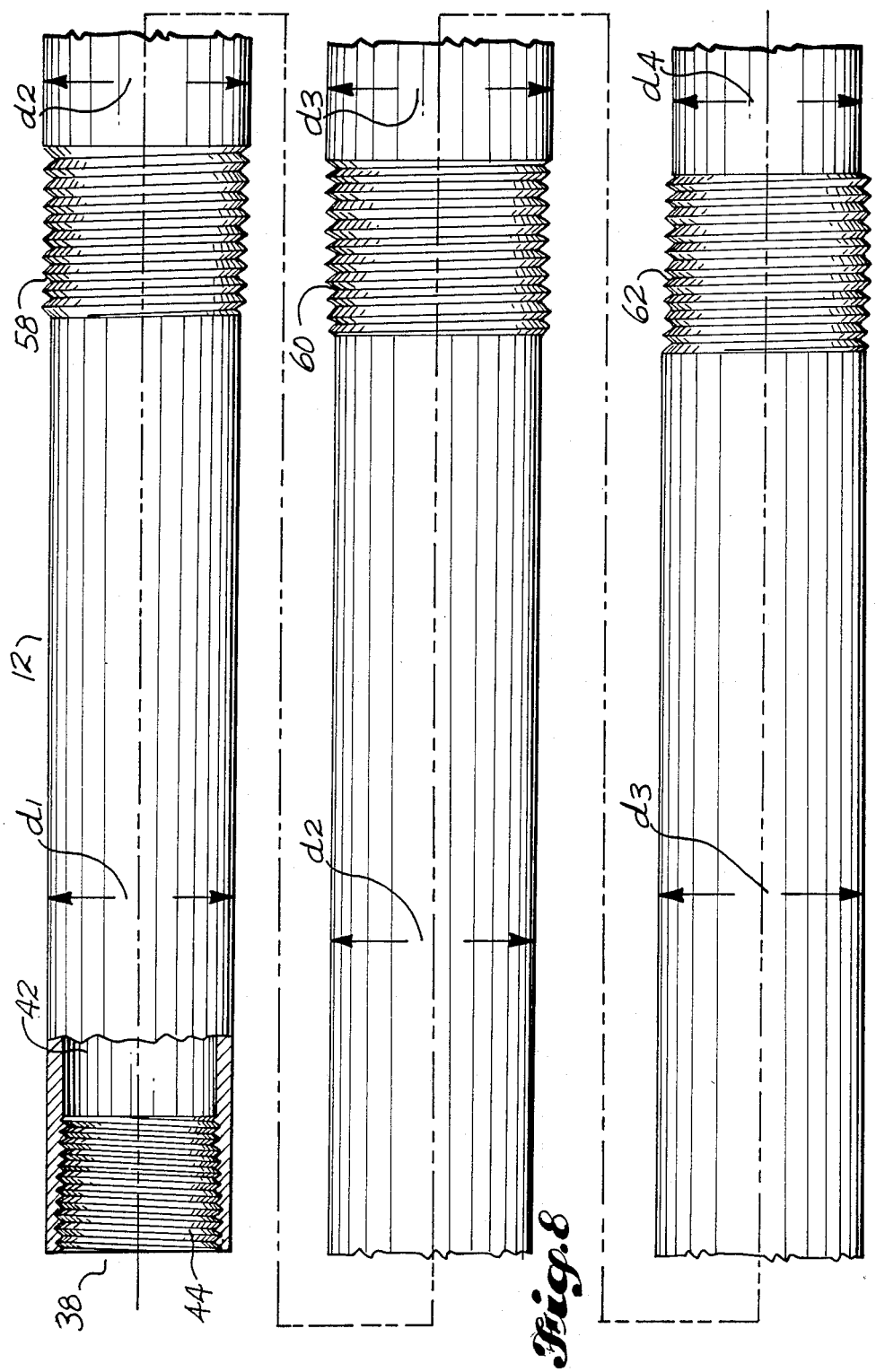

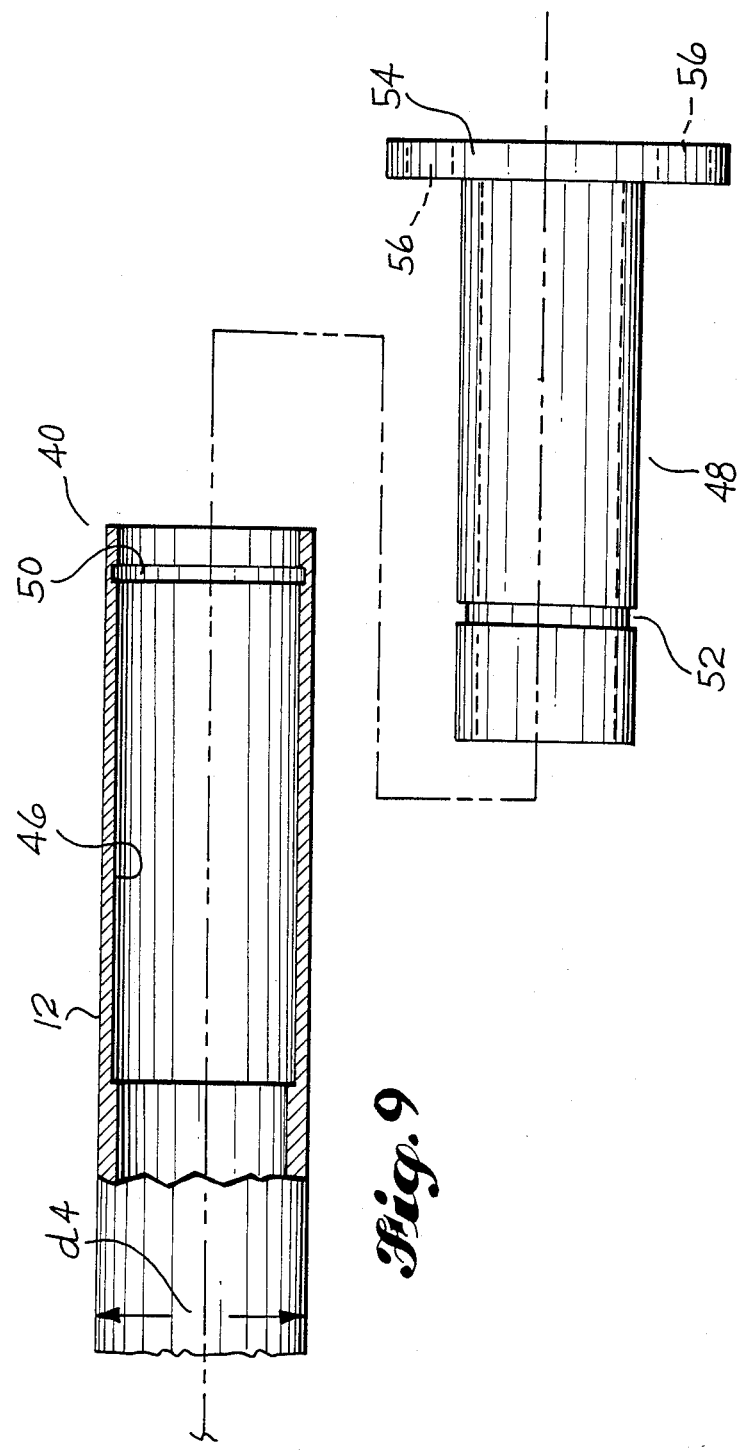

MULTISECTION HYDRAULIC DRIVE UNIT WITH SINGLE PISTON ROD

RELATED APPLICATIONS

This application is a continuation-in-part of my copending application Ser. No. 189,540, filed May 3, 1988 now U.S. Pat. No. 4,817,783 and entitled Single Piston Rod Hydraulic Drive.

TECHNICAL FIELD

This invention relates to hydraulic drive units. More particularly, it relates to the provision of a simplified hydraulic drive unit comprising plural movable cylinder bodies on a single piston rod.

BACKGROUND ART

There is a need for a compact drive unit composed of three or more reversible sections which have the capability of being moved either in unison or separately. One use for such a drive unit is for powering the floor members of a reciprocating floor conveyor.

Basically considered, a reciprocating floor conveyor comprises at least one group of at least three elongated floor members and a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It has also been proposed to drive a majority of the floor members in the desired conveying direction while at the same time retracting the remaining floor slat members. The present invention has application for both types of systems.

For background purposes, reference is made to my U.S. Pat. No. 4,793,469, granted Dec. 27, 1988, and entitled Reduced Size Drive/Frame Assembly For A Reciprocating Floor Conveyor, and all of the prior art that is disclosed in such patent. U.S. Pat. No. 4,793,469 discloses and claims a simplified hydraulic drive assembly which comprises a plurality of parallel hydraulic units, each having fixed opposite end portions and a travelling center portion. The travelling and fixed portions define variable volume fluid chambers. Each travelling portion is connected to a transverse drive beam. Each transverse drive beam is connected to one set of the floor members. The drive unit embodiment disclosed by U.S. Pat. No. 4,793,469 has a fixed piston rod and a travelling cylinder body.

A principal object of the present invention is to provide a hydraulic drive which when compared to the hydraulic drive disclosed by U.S. Pat. No. 4,793,469 is further simplified and further reduced in size.

The contents of my aforementioned U.S. Pat. No. 4,793,469 and my copending application Ser. No. 189,540 are both hereby fully incorporated by reference into the subject application.

DISCLOSURE OF THE INVENTION

A hydraulic drive unit of the present invention is basically characterized by an elongated tubular piston rod having first and second ends and a hollow interior. At least three piston heads are spaced apart along the piston rod and are fixed in position on the piston rod. A cylinder body is provided for each piston head. Each cylinder body is mounted to reciprocate back and forth on the piston rod relative to its piston head. Each cylinder body and its piston head together define first and second variable volume fluid chambers on opposite sides of the piston head. All of the first fluid chambers are located on a common side of the piston heads. All of the second fluid chambers are located on the opposite side of the piston heads. A separate fluid delivery and return tube is provided for each fluid chamber. These tubes extend through the hollow interior of the piston rod. Each tube has an inner end positioned to communicate with its first fluid chamber. The outer end of each tube is located at the end of the piston rod. The hollow interior of the piston rod defines a passage space between and around the tubes. The piston rod includes fluid delivery and return passages which connect the passage space of the hollow interior with each of the second fluid chambers.

In preferred form, the piston rod is a continuous one-piece tubular member Each piston head includes an annular body which surrounds and is thread connected to the piston rod. The piston rod is constructed to have stepped outside diameter portions so that each of the annular body portions of the piston heads can be slid into its position on the piston rod from one end of the piston rod.

In preferred form, the piston rod includes means at its first end for establishing a separate port in communication with the outer end of each of the tubes and an additional separate port in communication with the passage space in the hollow interior of the piston rod. Preferably, the piston rod is provided with a spherical ball at its first end and the ports are located within the spherical ball. In such embodiment, the spherical ball is adapted to be received within a socket which includes a separate fluid passageway in communication with each of the ports.

Other objects, features, and advantages of the invention will be hereinafter disclosed as a part of the description of the best mode of the invention.

BRIEF DESCRIPTION OF THE DRAWINGS

In the drawings, like reference numerals are used to designate like parts throughout the several views, and:

FIG. 2 is a pictorial view of the hydraulic drive unit shown by FIG. 1;

FIG. 3 is an enlarged scale fragmentary sectional view in the region of a cylinder end member at one end of a cylinder body;

FIG. 4 is a longitudinal sectional view of the second end portion of the hydraulic drive unit, including a longitudinal sectional view of a second end member at the second end of a cylinder body, such view including a side elevational view of a closure plug for the second end portion of the piston rod;

FIG. 8 is an enlarged scale view of a major portion of the piston rod, shown in three separate lengths;

FIG. 9 is a view like FIG. 8, showing the remainder of the piston rod, and showing the closure plug at the second of the piston rod exploded in position from the second end portion of the piston rod;

BEST MODE FOR CARRYING OUT THE INVENTION

Figure 1:
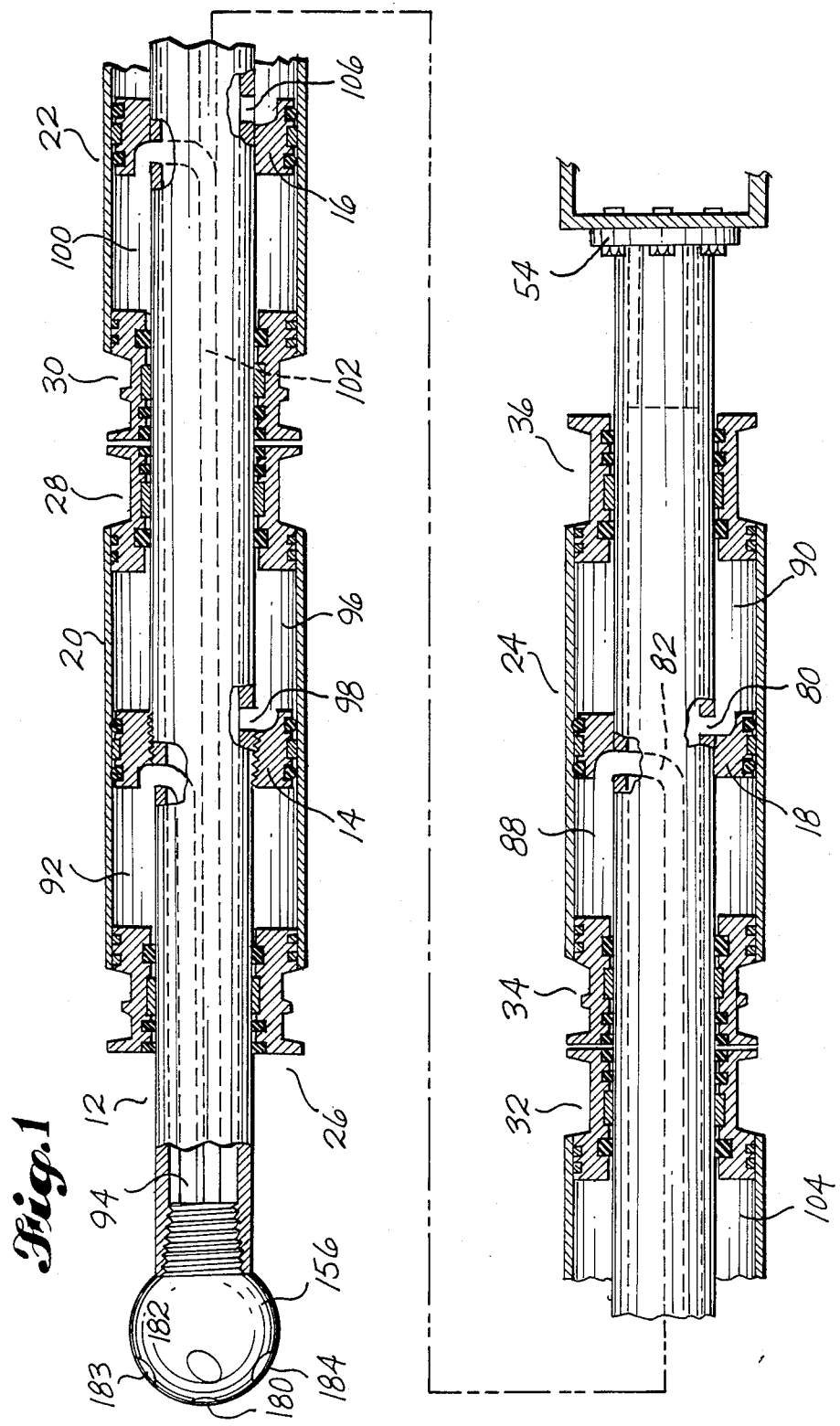
FIG. 1 is an elevational view of a drive unit embodying the present invention, shown in two separate lengths, with some parts of the unit shown in longitudinal section.

Referring to FIGS. 1 and 2, the hydraulic drive unit 10 that is illustrated comprises a single elongated piston rod 12, three axially spaced apart piston heads 14, 16, 18 secured to the piston rod 12, and three cylinder bodies 20, 22, 24. Each cylinder body 20, 22, 24 is mounted to reciprocate back and forth on the piston rod 12 relative to its piston head 14, 16, 18. Each cylinder body 20, 22, 24 and its piston head 14, 16, 18 together define two variable volume fluid chambers which are separated by the piston heads 14, 16, 18.

Each cylinder body 20, 22, 24 includes a cylinder head or end member at each of its ends. The cylinder heads for cylinder body 20 are designated 26 and 28. The cylinder heads for cylinder body 22 are designated 30 and 32. The cylinder heads for the cylinder body 24 are designated 34 and 36. The cylinder heads 26, 28, 30, 32, 34, 36 mount the cylinder bodies 20, 22, 24 onto the piston rod 12, for back and forth reciprocation along the piston rod 12. As will hereinafter be described in greater detail, the cylinder heads 26, 28, 30, 32, 34, 36 also carry seals which prevent hydraulic fluid leakage out from the opposite ends of the cylinder bodies 20, 22, 24. As will also be hereinafter described in greater detail, the cylinder heads 26, 28, 30, 32, 34, 36 form a couple for effectively transferring abaxial loads which are imposed on the cylinder bodies 20, 22, 24, from the cylinder bodies 20, 22, 24 to the piston rod 12.

In preferred form, the piston rod 12 is a continuous one-piece tubular member. A preferred construction of the piston rod 12 is illustrated by FIGS. 8 and 9 of the drawing.

Referring to FIGS. 8 and 9, in preferred form the piston rod 12 is a one-piece tubular member having a first end 38, a second end 40 and a hollow interior 42. The hollow interior 42 may be a continuous center passageway which extends throughout the full length of piston rod 12. At the first end 38, the interior of the passageway 42 may be threaded at 44. At the second end 40, the piston rod 12 may include an increased diameter section 46 which is sized to receive a closure plug 48. A first annular seal groove 50 may be formed in the inner wall of section 46. A second annular seal groove 52 may be formed in the outer wall of the closure plug 48. Conventional 0-ring seals 54, 56 (FIG. 4.) are installed in the grooves 50, 52, for the purpose of sealing against leakage of hydraulic fluid out from the second end of the piston rod 12. The closure plug 48 includes a mounting plate 54 at its outer end which may include fastener receiving openings 56.

Piston rod 12 also includes three exterior threaded sections 58, 60, 62, one for each of the piston heads 14, 16, 18. As shown by FIGS. 8 and 9, the outside diameter of the piston rod 12 varies in a manner permitting easy installation and removal of annular body portions of the piston heads 14, 16, 18. A first section of the piston rod 12, extending from the first end 38 to the first threaded section 58, includes an outside diameter d-1. In its extent between threaded section 58 and a second threaded section 60, the piston rod 12 has an outside diameter d-2 which is slightly larger than diameter d-1. In its extent between threaded section 60 and a third threaded section 62, the piston rod 12 has a third outside diameter d-3 which is slightly larger than diameter d-2. In its extent between threaded section 62 and the second end 40, the piston rod 12 has an outside diameter d-4. Diameter d-4 is slightly smaller than diameter d-3. The threads in section 58 are cut into a length of the diameter d-2. In similar fashion, the threads in section 60, 62 are cut into lengths of the diameter d-3.

Owing the above-described construction of the piston rod 12, the annular body of piston head 16 is slid into place on the piston rod 12 from the first end 38. It includes a threaded opening through which diameters d-1 and d-2 will fit. The center opening in the annular body for piston head 16 is aligned with the first end 38 of piston rod 12 and then the annular body is moved along the piston rod 12 to the threaded section 60. When it reaches the threaded section 60, it is rotated for the purposes of threading it onto the threaded section 60, to in that manner connect it to the piston rod 12. The annular body for piston head 14 includes a threaded center opening which is sized to receive and pass the first diameter section of the piston rod 12. Accordingly, following installation of the annular body for piston head 16, the center opening in the annular body for piston head 14 is aligned with end 38 of piston rod 12. Then, this annular body is slid along the first diameter section of the piston rod 12 to the threaded section 58. The annular body is then rotated for the purpose of threading it onto the threaded section 58 to in that manner connect it to the piston rod 12. The annular body for piston head 18 is installed from the second end 40 of the piston rod 12. It has a threaded central opening which is sized to freely pass through it the second end portion of the piston rod 12. The annular body of piston head 18 is installed in the same manner as the annular bodies for the piston heads 14, 16. That is, the center opening in the annular body 64 is aligned with the second end 40 of piston rod 12. Then, the annular body 64 is slid along the second portion of piston rod 12 to the threaded section 62. It is then rotated for the purpose of threading it onto the threaded section 62 to in that manner secure it to the piston rod 12.

Figure 10:
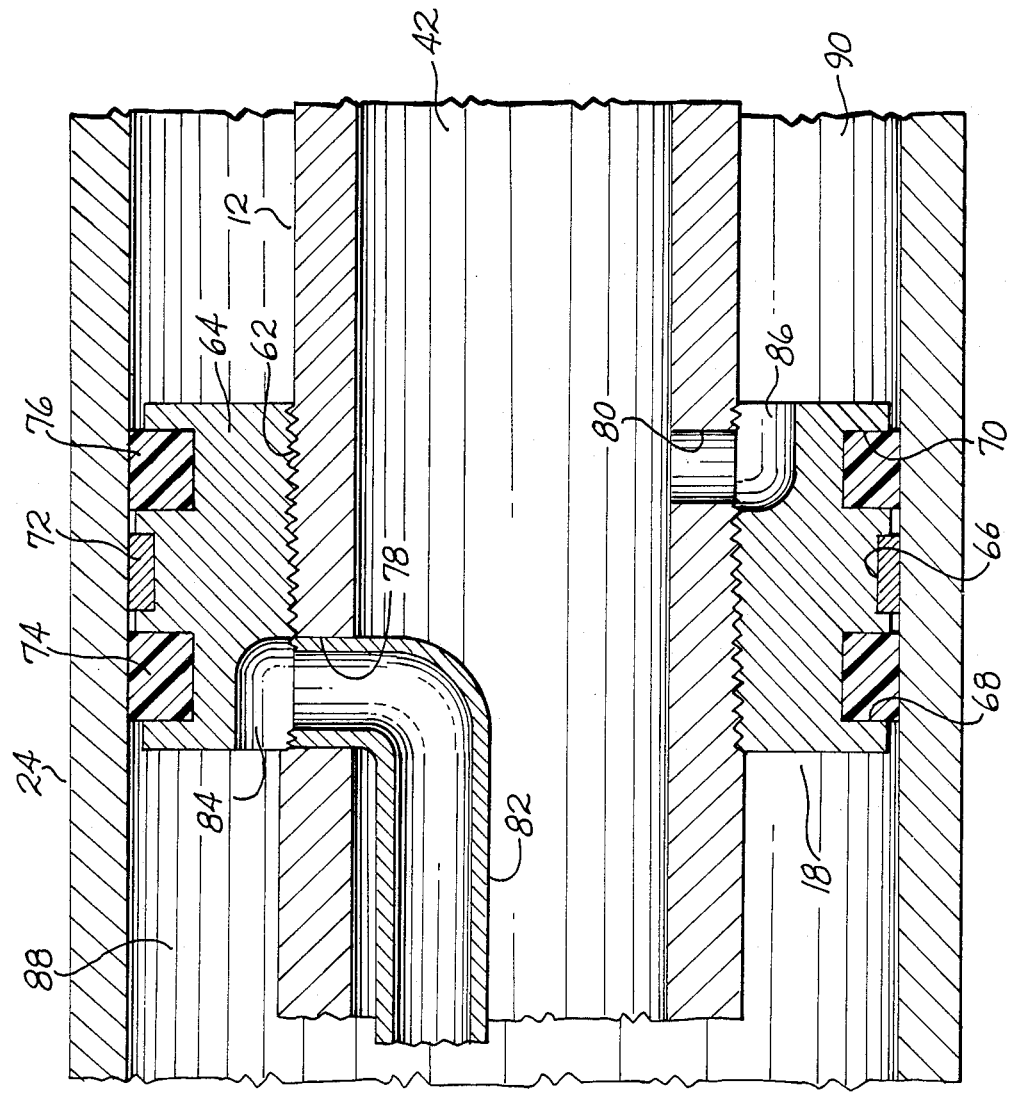
FIG. 10 is a longitudinal sectional view, on a larger scale, in the region of one of the piston heads.

FIG. 10 is a fragmentary longitudinal sectional view of the hydraulic drive unit 10 in the region of piston head 18 for drive section III. In this view, the annular body portion 64 of piston head 18 is shown to be thread connected to the threaded section 62 on piston rod 12. Body 64 is shown to include a central annular groove 66 that is flanked by annular grooves 68, 70. A wear ring 72 is positioned within groove 66. Seal rings 74, 76 are positioned within the grooves 68, 70.

The piston rod 12 is provided with a pair of sidewall openings 78, 80 in the vicinity of piston head 18. Opening 78 is sized to receive the inner end portion of a tube 82. Opening 78 communicates with a port 84 which is machined into the body 64. Opening 80 communicates with a port 86 which is machined into a second portion of the body 64. The construction that is illustrated by FIG. 10 is essentially duplicated at each of the piston heads 14, 16. That is, for each of piston heads 14, 16, a fluid conveying tube extends through the hollow interior 42 of the piston rod 12. Each tube has an inner end portion which is connected to communicate with its fluid chamber. The hollow interior 42 of the piston rod 12 is in communication with each second fluid chamber.

Referring to FIG. 1, the pipe or tube leading to fluid chamber 92 in drive section I is designated 94. The passageway leading from the hollow interior 42 of piston rod 12 into fluid chamber 96 is designated 98. The pipe or tube leading to fluid chamber 100 in drive section II is designated 102. The passageway leading from the hollow interior 42 of the piston rod 12 into fluid chamber 104 is designated 106.

Referring to FIG. 3, end member or head 26, which is identical to end members 30, 34, comprises an inner end portion 110 which extends into the end of a cylindrical wall 112 of cylinder body 20. Lock rings 114 may be used for connecting member 26 to member 112. Member 26 includes an outer end portion 116 which projects endwise outwardly from member 112. It may include rings 118, 120 and grooves 122, 124, which define a structure which receives members used for connecting the end member 26 to some other structure, such as a transverse drive beam for a reciprocating floor conveyor. The member 26 includes a center opening 126 sized to snugly fit around the piston rod 12. The wall of opening 126 includes a plurality of axially spaced apart grooves for receiving annular wiper rings 128, 130, a wear ring 132, and a seal ring 134.

Referring to FIG. 4, the end member or head 36 is identical to end members or heads 28, 32. It includes an inner end portion 136 which fits into the cylindrical wall portion 138 of cylinder body 24. As in the case of end member 26, a pair of lock rings 140 may be used for securing member 136 to member 36. Member 36 includes an axially outwardly projecting outer end portion 142 comprising a ring 144 and a groove 146. The ring 144 and groove 146 provide a portion used for connecting the member 36 to another structure, such as a transverse beam of a reciprocating floor conveyor.

My aforementioned copending application Ser. No. 189,540 illustrates (FIG. 1) a manner of associating transverse drive beams of a reciprocating conveyor with each movable section of the drive unit. This same type of arrangement can be used with the drive unit of the present invention, with spaced apart central side portions of the transverse drive beam being connected to the end members 26, 28 and 30, 32 and 34, 36. An advantage of this type of connection is that the end members of each section I, II, III of the drive unit 10 create a couple which resists abaxial forces and moments imposed by the transverse drive beams on the travelling cylinder bodies.

End member 36 includes a center opening 148 sized to snugly fit about the piston rod 12. A plurality of axially spaced apart annular grooves are provided in the wall of the center opening 148 for receiving a pair of wiper rings 150, a wear ring 152, and a seal ring 154.

The end members 26, 28 and 30, 32 and 34, 36 are intentionally given a substantial length to aid them in transferring abaxial forces and moments onto the piston rod 12. This arrangement of the end members 26, 28 and 30, 32 and 34, 36, together with the use of a continuous one-piece tubular piston rod 12, results in a drive unit which is not only simple in construction and compact but is quite strong and is self-bracing. The drive unit can carry substantial abaxial forces and moments without damage to the seals.

In preferred form, a connector ball 156 is provided at the first end 38 of the piston rod 12. Ball 156 may be constructed from an outer major part 158 and an inner minor part 160. The inner part 160 may include and externally threaded pin or nipple 162 which threads into the threads 44. Ball parts 158, 160 are shown to be connected together by a plurality of machine screws 162. These machine screws are shown to extend through openings in a flange portion 164 of the minor part 160 and to thread into openings 166 in the major part 158. Of course, the machine screws could instead extend through openings in the major part and thread into openings in the minor part.

Figure 5:
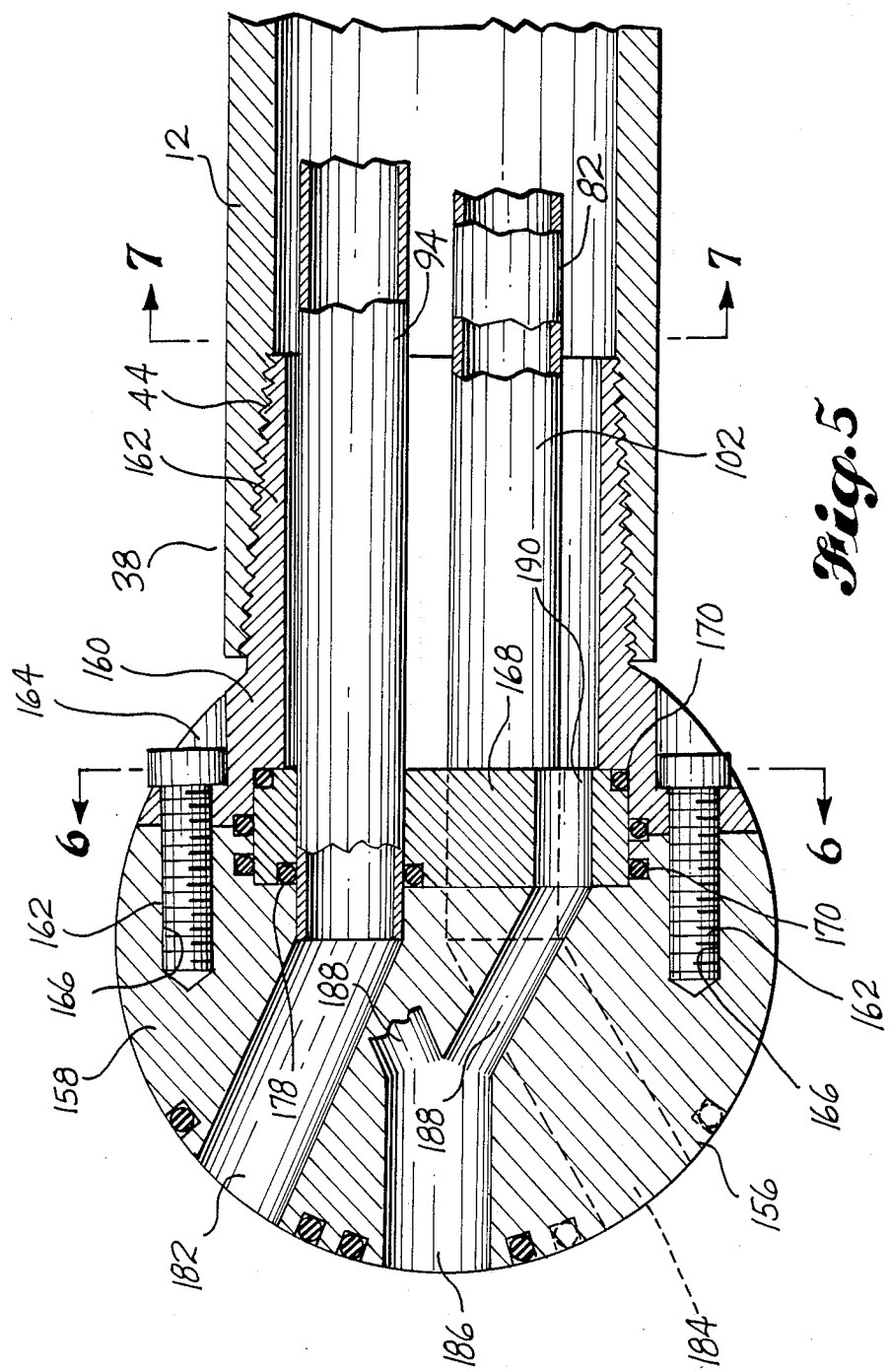
FIG. 5 is an enlarged scale view of a ball component at a first end of the piston rod, such view also showing a support member at the first end of the piston rod which supports separate delivery-return tubes which extend between ports in the ball and fluid chambers on a common side of the piston heads, and also showing communication between a fourth port in the ball and the hollow interior of the piston rod.
Figure 7:
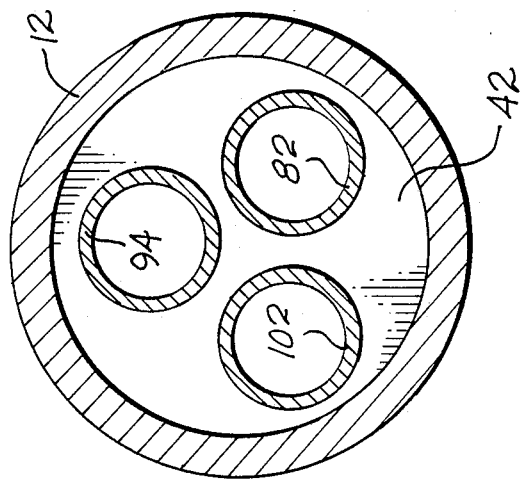
FIG. 7 is a cross-sectional view taken substantially along line 7—7 of FIG. 5.
Figure 6:
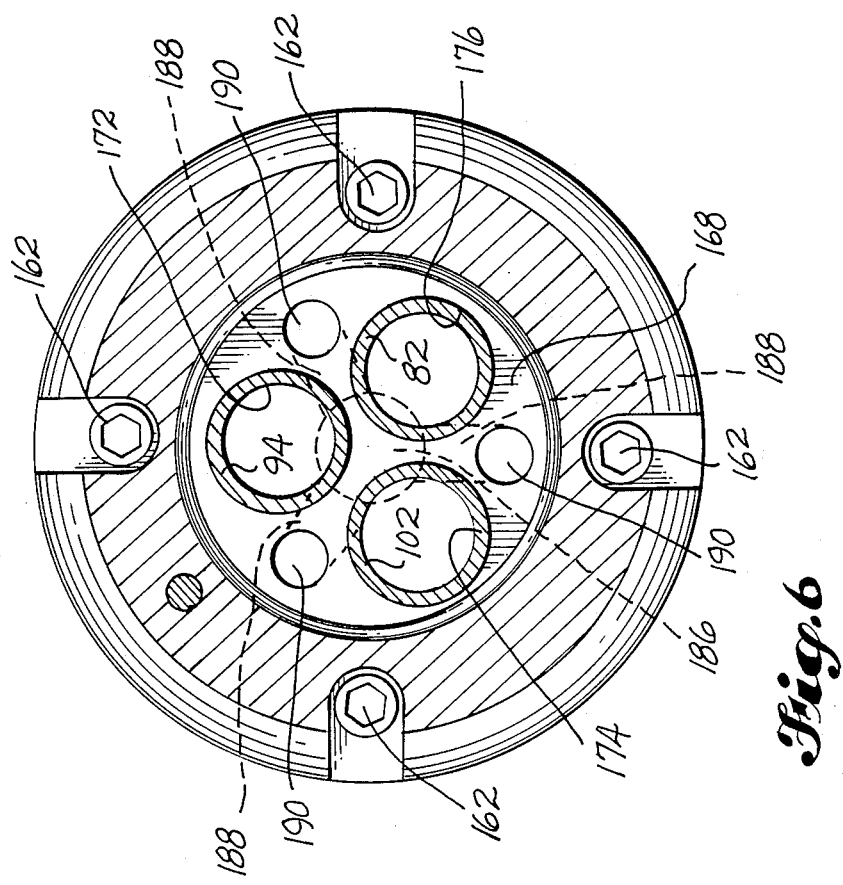
FIG. 6 is a cross-sectional view taken substantially along line 6—6 of FIG. 5.

As illustrated, a support member, which may be a disk 168, is clamped between the two portions 158, 160 of the ball 156. A plurality of O-ring seals 170 are provided between the member 168 and the ball parts 158, 160, to seal against fluid leakage. As best shown by FIG. 6, member 168 is formed to include three parallel axial openings 172, 174, 176. These openings are sized to snugly receive the outer end portions of the fluid supplied in return tubes 94, 102, 82. As shown in FIG. 5, in connection with tube 94, an O-ring seal 178 is provided in a groove about the opening 172 for sealing between the member 168 and the tube 94. Identical seals are provided around tubes 102 and 82.

FIG. 5 shows the outer end of tube 94 communicating with a passageway 180 in the ball 156. There is a broken line showing of a similar passageway 184 for tube 102. A third passageway 183 exists in the ball 156 for tube 82. A fourth passageway 186 connects at its inner end to a plurality of branch passageways 188. The branch passageways 188 extend to an equal number of openings 190 which are provided in member 168. Each of these openings 190 communicate with the inner space 42 of the piston rod 12 which exists around and inbetween the tubes 82, 94, 102. As previously described, this space 42 serves as the supply and return passageway for each of the three second fluid chambers 96, 104, 90.

According to an aspect of the invention, the ball 156 is received within a socket member 192. The socket member 192 may be constructed in two pieces which are bolted together about the ball 156. The socket member 192 includes passageways 194, 196, 198, 200 which communicate respectively with the outer ends of the passageways 180, 184, 183, 186 in the ball 156.

Figure 11:
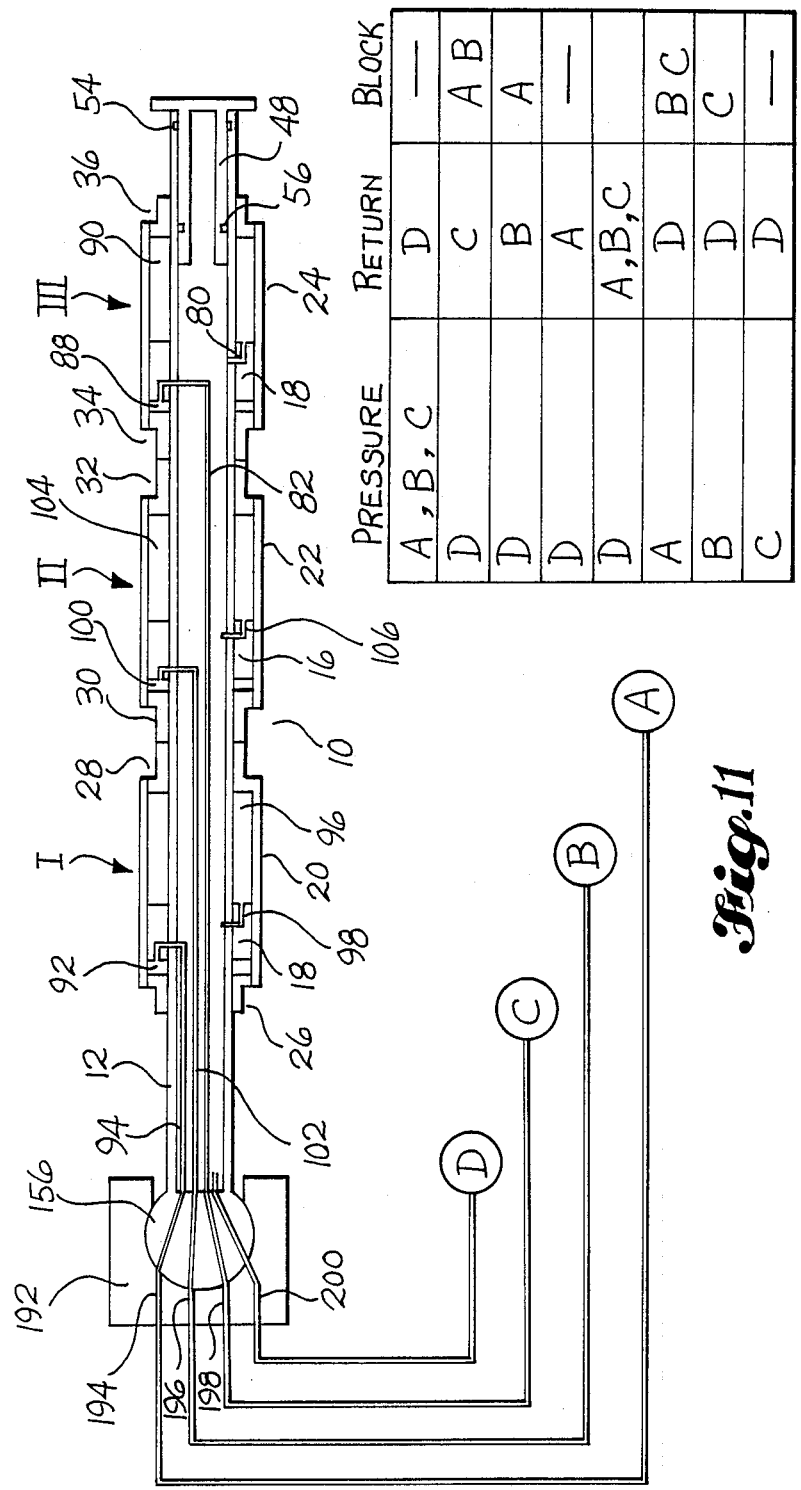
FIG. 11 is a schematic diagram of the hydraulic drive unit.

Referring to FIG. 11, passageway 94 is shown to extend to a control port A. Passageway 196 is shown to extend to a control port B. Passageway 196 is shown to extend to a control port C. Passageway 200 is shown to extend to a control port D. Stated another way, control port A is connected to fluid chamber 92 and controls fluid into and out from chamber 92. Control port B is connected to fluid chamber 100. It controls the flow of fluid into and out from chamber 100. Control port C is connected to fluid chamber 88. It controls fluid into and out from chamber 88. Control port D is connected to each of chambers 96, 104, 90. It controls fluid into and out from chambers 96, 104, 90.

Any type of mechanism may be used for controlling the ports A, B, C, D. Control ports A, B, C, D may be ports in valves having two (pressure and return) or three (pressure, return and block) positions. The movement between these positions may be controlled by a computer, may be controlled mechanically, may be controlled by a timer circuit, or by pilot valves operated mechanically, electrically or by fluid pressure signals. The particular system for controlling the operation of the control ports A, B, C, D is not a part of this invention The sequence of operation of control ports A, B, C, D is a part of the invention.

Let it be assumed that the hydraulic unit 10 is being used to power three drive beams of a reciprocating floor conveyor. Let it also be assumed that all three drive sections I, II, III are in the position shown in FIG. 11 and it is desired to move them simultaneously or in unison to the left as illustrated. This is simply done by connecting ports A, B, C to pressure and port D to return. Pressure enters all three chambers 92, 100, 88 while chambers 96, 104, 90 are connected to return pressure. In response, the three cylinder bodies 20, 22, 24 will be shifted to the left, as illustrated. When the three cylinder bodies 20, 22, 24 are in the new position, and it is desired to return them sequentially, this is also easily done. Port D is connected to pressure, ports A and B are either also connected to pressure or are blocked, and port C is connected to return. As will readily be apparent, cylinder body 24 will be moved to the right while cylinder bodies 20, 22 will be prevented from movement. Next, while pressure is maintained at port D, and pressure is also maintained at port A, or port A is retained in a block condition, port B is connected to return. This results in cylinder body 22 moving to the right while cylinder body 20 is prevented from movement. Then, while maintaining pressure at port D, port A is connected to return. In response, cylinder body 20 moves to the right.

The ports A, B, C, D can also be operated to cause a total reverse movement of the drive unit 10. Assume that all of the cylinder bodies 20, 22, 24 are shifted to the right from the position shown in FIG. 11. Assume also that it is desired to move them in unison toward the left. This is simply done by connecting port D to pressure while connecting ports A, B, C to return. Chambers 96, 104, 90 are all connected to pressure while chambers 92, 100, 88 are all connected to return. As a result, all three cylinder bodies 20, 22, 24 are moved from a full left position over to a full right position. Sequential return of the cylinder bodies 20, 22, 24 is achieved in the following manner. Port A is connected to pressure and port D is connected to return. Ports B and C are either blocked or connected to return. As a result, cylinder body 20 moves by itself to the left. Next, pressure is delivered to port B while port D is connected to return and port C is either blocked or connected to return. In response, cylinder body 22 is moved to the left while cylinder body 24 stays at rest. Next, pressure is delivered to port C while port D is connected to return. In response, cylinder body 24 is moved to the left.

It is to be understood that the illustrated embodiment is presented primarily by way of example. The constructural details and arrangements of many of the parts can vary. For example, the closure plug 48 could be replaced by a screw-in plug or an end piece could be welded onto the second end of the piston rod 12. Also, the number of drive sections may be increased. Accordingly, the scope of protection is not to be limited by the disclosed examples, but is to be determined solely by the following claims. The claims are to be interpreted in accordance with the established rules of patent claim interpretation, including use of the doctrine of equivalents.

What is claimed is:

1. A hydraulic drive unit, comprising:
   an elongated tubular piston rod having first and second ends and a hollow interior;
   at least three piston heads spaced apart along the piston rod and fixed in position on the piston rod;
   a cylinder body for each piston head, each said cylinder body being mounted to reciprocate back and forth on said piston rod, relative to its piston head, each said cylinder body and its piston head together defining first and second variable volume fluid chambers, separated by the piston head, with said first fluid chambers being located on a common side of the piston heads and said second fluid chambers being located on the opposite side of the piston heads;
   a separate fluid delivery and return tube for each first fluid chamber, said tubes extending through said hollow interior of the piston rod, each said tube having an inner end positioned to communicate with its first fluid chamber and an outer end adjacent the first end of the piston rod;
   said hollow interior of said piston rod defining a passage space between and around said tubes; and
   said piston rod including fluid delivery and return passages which connect said passage space of its hollow interior with each of the second fluid chambers.

2. A hydraulic drive unit according to claim 1, wherein said piston rod is a continuous one-piece tubular member.

3. A hydraulic drive unit according to claim 2, wherein each piston head includes an annular body which surrounds and is connected to the piston rod.

4. A hydraulic drive unit according to claim 3, wherein the annular bodies of the piston heads are thread connected to the piston rod.

5. A hydraulic drive unit according to claim 4, comprising three piston heads, wherein said tubular piston rod includes a first section of threads by which it is connected to the annular body of a center one of said piston heads, said piston rod having an outside diameter in its extent from said threaded section toward the first end of the piston rod of a size such that the annular body of the center head can be installed at the first end of the piston rod and moved along a reduced diameter portion of the piston rod to said first section of threads, said piston rod including a second section of threads located between said first section of threads and the first end of the piston rod, for making threaded engagement with the annular body of a second of said three piston heads, and said piston rod in its extent between the first end of the piston rod and the second section of threads, having an outside diameter of a size such that the second annular body can be placed onto the first end of the piston rod and slid along the piston rod to said second section of threads, and said piston rod including a third section of threads positioned between the first section of threads and the second end of the piston rod, and said piston rod in its extent between the third section of threads and the second end of the piston rod including an outside diameter of a size to allow the annular body of the third piston head to be inserted onto the second end of the tubular piston rod and slid along the tubular piston rod to the third section of threads.

6. A hydraulic drive unit according to claim 1, comprising a support at the first end of the piston rod for supporting the tubes in a spaced apart relationship, and means endwise outwardly of said support establishing a separate port in communication with the outer end of each of said tubes, and an additional separate port in communication with the passage space in the hollow interior of the piston rod.

7. A hydraulic drive unit according to claim 6, wherein said piston rod includes a spherical ball at its first end and said ports are located within said spherical ball, said spherical ball being adapted to be received within a socket which includes a separate fluid passageway in communication with each of said ports.

* * * * *